United States Patent Office 3,646,006
Patented Feb. 29, 1972

3,646,006
CRYSTALLIZATION PROCESS
Frank Whitley Lord, Manchester, England, assignor to Imperial Chemical Industries Limited, London, England
No Drawing. Filed Sept. 30, 1968, Ser. No. 763,982
Claims priority, application Great Britain, Oct. 16, 1967, 47,076/67
Int. Cl. C07c 47/18
U.S. Cl. 260—209 R
9 Claims

ABSTRACT OF THE DISCLOSURE

Supercooled liquid organic materials are induced to crystallize by dispersing fine bubbles of gas or liquid throughout the liquid material.

---

This invention relates to an improved process for converting liquid materials into crystalline form.

Many liquid materials can be cooled without change of state to temperatures at which the materials would normally be partly or wholly crystalline. In such supercooled liquids crystallization can usually be induced by adding crystals of the material or by mechanical means such as breaking the liquid surface or "scratching" the surface of the container below the liquid surface. However the rate of spread of crystallization through the bulk of the material, particularly if the liquid material is viscous, may be very slow. This may be very inconvenient in a manufacturing process, particularly a continuous manufacturing process, since it may limit severely the rate of output from a plant of given size. Furthermore crystalline material prepared in this way suffers from the disadvantage that when compressed, as for example in sacks placed in piles, the material compacts into large lumps which are difficult to handle and frequently unsatisfactory in use and which cannot easily be broken down into conveniently sized pieces. Also in the cases where the material is not a pure compound, slow crystallization may cause some separation of the components and samples taken from one part of the crystalline mass may not be representative of the whole. By the process of the present invention supercooled liquids are converted rapidly into an essentially homogeneous crystalline form which is more resistant to compacting under pressure.

According to the invention there is provided an improved process for converting a liquid organic material into crystalline form which comprises the steps in combination of forming a dispersion of fine bubbles throughout the bulk of the liquid material and maintaining the liquid material at a temperature below the crystallizing point of the liquid material but at which the supercooled liquid material is still liquid.

The liquid material may be a pure organic compound or a mixture containing one or more organic compounds. Since mixtures are normally more reluctant to crystallize the process of the invention is of particular value when applied to such materials, although as the amount of impurity or complexity of the mixture increases a point may be reached at which crystallization, however induced, becomes for practical purposes an impossibility. Such mixtures will normally be homogeneous mixtures of miscible liquids but the process may also be applied to inhomogeneous mixtures, such as emulsions, of liquids which are not completely miscible in the relative proportions used, leading to products in which one or both of the liquid phases has been converted into a crystalline form. The process of the invention may be applied to liquid materials which contain solid materials in suspension, whether such solid materials are insoluble in and different from any of the components of the mixture, or are formed by partial crystallization of the liquid mixture.

In those cases where the final product is only partially crystalline the process of the invention can be combined with a purification process, for example by separating the final crystals from the residual liquid by filtration.

By liquid is meant a state of matter in which the molecules are relativesly free to change their positions with respect to each other but restricted by cohesive forces so as to maintain a relatively fixed volume. The term does not include glasses and the like which are states of matter in which the relative motion of the molecules is restricted so that they tend to retain a definite fixed position relative to each other and which may be said to have a definite shape and volume.

The process of the invention is of especial value with liquid organic materials which are viscous in the supercooled state since such viscous liquids are normally slow to crystallize.

Suitable liquid materials include a wide range of compounds and mixtures with suitable crystallizing points, for example chemicals used in the processing of polymers such as rubbers, including accelerators, antioxidants such as aromatic amines, phenols and phenolic condensation products, polynuclear hydrocarbons and solutions of for example sugars, including sucrose.

The bubbles may be dispersed in the liquid material by any conventional method, for example vigorous agitation by mechanical means such as a stirrer, or by ultrasonic agitation. The bubbles may be comprised of gas or liquid or a mixture of these which may for example be in contact with the surface of the liquid material and drawn into the liquid material by the dispersing means or be introduced below the surface of the liquid material. Any gas, for example air and/or liquid for example water may be used as long as suitable for the liquid material in question; a gas or liquid which interacted with the liquid material, or which was undesirably soluble or miscible with the liquid material, or which could not be tolerated in the final crystalline product having regard to the use for which the product was intended would not be suitable. Mixtures of gases or of liquids may be used if desired. The bubbles may contain small particles of solid materials.

The bubbles should be of small size and in general below about 1 mm. in diameter. The size limitation does however vary with the liquid material and in some cases somewhat larger bubbles can be tolerated while in others smaller sizes are necessary to obtain a considerable increase in the rate of crystallization. The preferred bubble size is less than 0.05 mm. and more particularly preferred less than 0.01 mm.

As the number of bubbles of suitable size per unit volume of the liquid material increases the improvement in speed of crystallization tends to become greater, and in many cases it is possible to control the rate of crystallization by the degree of for example agitation and/or the amount of gas or liquid available for bubble formation. If however it is desired to obtain large crystals it may be necessary to limit the number of bubbles per unit volume of liquid material.

Suitable amounts of gas or liquid are from 0.1 to 20% by volume, and preferably from 0.25 to 2.0% by volume, of the liquid material. Amounts below these ranges may be used but are less effective. Larger amounts may be used but afford little further advantage in most cases.

It is important that the bubbles be dispersed essentially uniformly throughout the liquid material, as any part of this liquid material which contains few or no bubbles will be slow to crystallize and may afford an unsatisfactory solid product. This degree of dispersion should be maintained at least until crystallization has commenced; in the case of very viscous liquid materials and very fine bubbles the dispersion will be very slow to settle or lose fine bubbles through coalescence of the bubbles, but in the case of less viscous materials it may be necessary to provide for agitation during at least part of the crystallization.

Loss of fine bubbles through coalescence may be diminished by the addition of small amounts of surface-active agents such as non-ionic surfactants, for example condensation products of from 1 to 30 molecular proportions of ethylene oxide with long chain alcohols such as oleyl or cetyl alcohol, fatty acids, such as oleic acid, fatty acid amides, long chain amines such as octadecylamine, and phenols particularly alkyl phenols, and siloxane-oxyalkylene block copolymers.

The temperature of the liquid material may be below the temperature at which crystallization can begin before the bubbles are dispersed in the liquid material or may be brought below that temperature after the bubbles have been dispersed and while the dispersion is maintained. The desirable extent to which the liquid material should be supercooled and the temperature at which the dispersion is formed will depend upon the circumstances in each case, particularly the viscosity of the liquid material, bearing in mind for example that the viscosity will increase with lower temperatures thus making the formation of a dispersion of fine bubbles more difficult and decreasing the rate of progagation of crystallinity but increasing the stability of the dispersion of bubbles. If required the liquid material can be further cooled during the crystallization. A low initial temperature and/or further cooling will normally be desirable where the latent heat of fusion of the solid to the liquid material is high or where, as is particularly the case with mixtures, the temperature required for complete crystallization is considerably lower than that permitting partial crystallization. The procedure wherein the bubbles are dispersed in the liquid material at a temperature above that at which crystallization can begin and the liquid material then cooled as necessary, is frequently of advantage with very viscous liquid materials, although this procedure has the disadvantage with less viscous materials that it is usually difficult or inconvenient to maintain the bubble dispersion in a satisfactory state while carrying out the cooling.

The process of the invention may be used in suitable cases to afford shaped crystalline particles by shaping the liquid material after dispersion bubbles within it, and then cooling the material under such conditions that crystallization takes place before the material loses its shape. For example bubbles are dispersed in a liquid material which is formed by conventional methods into droplets which are quenched in a bath at a suitable temperature.

The invention is illustrated but not limited by the following examples in which all parts and percentages are by weight unless otherwise stated.

EXAMPLE 1

100 parts of crude liquid 4 - (1,3-dimethylbutylamino) diphenylamine at room temperature are pumped through a peg-stirrer rotating at 500 r.p.m. Air is drawn in at the top of the stirrer and dispersed in the liquid in the form of small bubbles of about 0.1 mm. in diameter as determined by examination of the material after solidification. The air nucleated liquid is allowed to flow onto a steel band at a temperature of 20° C. to conduct away the heat of crystallisation. The liquid solidifies in about 30 seconds and at this stage can readily be flaked or otherwise removed from the band.

If the liquid is poured onto the cold, steel band without nucleation it takes at least 1 hour to solidify.

The concentration of air in the un-nucleated flake was found to be 0.5% all of which consisted of large occluded bubbles too large to be an effective nucleant. 3.5% of air all of which was in the form of tiny bubbles is found in the flake prepared from the nucleated liquid.

EXAMPLE 2

100 parts of 4 - isopropylaminodiphenylamine at 60° C. are poured into the peg-mixer under the same experimental conditions as in Example 1. The resulting nucleated liquid crystallized in 30 seconds. The same volume of un-nucleated liquid takes 10 minutes.

EXAMPLE 3

100 parts of a syrup prepared by heating 500 parts of sucrose with 100 parts of water until a viscous, homogeneous syrup is obtained are pumped at 40° C. through a peg-stirrer rotating at 500 r.p.m. Crystallization of the syrup occurs within 30 seconds. The un-nucleated syrup showed no signs of crystallization after standing for 7 days at 20° C.

EXAMPLE 4

To 100 parts of crude liquid 4 - (1,3 - dimethylbutylamino) diphenylamine at room temperature is added 1 part of water. The mixture is mixed at about 500 r.p.m. in such a manner that the water is dispersed as small droplets without the inclusion of air. Crystallization of the product occurs within 10 minutes. The un-nucleated liquid requires about 2 hours and crystallizes in the form of large crystals. The water nucleated sample crystallizes in very small crystals and is more resistant to compacting under load.

EXAMPLE 5

1 part of a siloxane-oxyalkylene block copolymer commercially available under the name Silicone L 520 is mixed with 100 parts of 4-isopropylaminodiphenylamine at 80° C. and the resulting mixture passed through a peg-stirrer at 500 r.p.m. The resulting air-nucleated liquid crystallizes in about 5 minutes in the form of a hard material comprising very small crystals.

If the surfactant is omitted, crystallization is slower and the product comprises larger crystals. If nucleation is not carried out the crystallization is slower still.

EXAMPLE 6

100 parts of distilled phenyl α-naphthylamine at 65° C. are pumped through a peg-stirrer rotating at 500 r.p.m. Air is drawn in at the top of the stirrer and dispersed in the liquid in the form of small bubbles of about 0.1 mm. in diameter. The air-nucleated liquid is allowed to flow onto a steel band at a temperature of 20° C. to conduct away the heat of crystallization. The liquid solidifies in about 30 seconds and at this stage can readily be flaked or removed from the band.

If the liquid is poured onto the cold, steel band without nucleation it takes at least 30 minutes to solidify. The above procedure of air-nucleation can also be carried out in crude phenyl α-naphthylamine product. The solidification time is similar to that obtained with distilled material.

Example 7

100 parts of crude 4-(1,3-dimethylbutylamine) diphenylamine are air-nucleated by the method described in Example 1. The air-nucleated liquid is poured through a metal gauze into a quenching bath. The height of the gauze above the quenching bath is such that the stream of nucleated liquid is broken into droplets. The quenching bath contains water diluted with 33% of methanol to reduce its density to less than that of the solid product. In this way spherical crystalline particles of controlled size can be obtained which are very readily handled.

Example 8

The procedure of Example 1 is repeated. A portion of the air-nucleated liquid from the exit of the mixture is examined on a microscope-stage which has been preheated to 40° C. At this temperature crystallization is retarded sufficiently to permit visual assessment of the size of the air bubbles. The majority of the air bubbles are initially of the order of 0.01 mm. in diameter, but there are a substantial number of smaller bubbles. Coalescence into larger bubbles is quite rapid.

The greater part of the air-nucleated liquid is allowed to flow onto a steel band as described in Example 1 and affords in about 30 seconds a solid product which can be readily flaked or otherwise removed from the band. This solid product is similar to that obtained in Example 1 and contains air-bubbles the majority of which are about 0.1 mm. in diameter.

I claim:

1. In a process for converting a crystallizable liquid organic material into crystalline form, the improvement which consists essentially of the steps in combination of forming a dispersion of fine bubbles throughout the bulk of the liquid material, said liquid material being selected from the group consisting of antioxidants such as aromatic amines, phenols and phenolic condensation products and sucrose, and maintaining the liquid material at a temperature below the crystallizing point of the liquid material but at which the supercooled liquid material is still liquid.

2. A process as claimed in claim 1 wherein the bubbles are less than 1 mm. in diameter.

3. A process as claimed in claim 1 wherein the amount of gas or liquid is from 0.1 to 20% by volume of the liquid material.

4. A process as claimed in claim 1 wherein the bubbles consist essentially of gas.

5. A process as claimed in claim 1 wherein the bubbles consist essentially of liquid.

6. A process as claimed in claim 1 wherein the bubbles are dispersed in the liquid material at a temperature below the crystallizing point of the liquid material.

7. A process as claimed in claim 1 wherein the bubbles are dispersed in the liquid material at a temperature above the crystallizing point of the liquid material which is then cooled below its crystallizing point.

8. A process as claimed in claim 1 wherein the liquid material is a rubber antioxidant based on aromatic amines.

9. A process as claimed in claim 1 wherein the liquid material is an aqueous sucrose solution.

References Cited

UNITED STATES PATENTS

| | | | |
|---|---|---|---|
| 3,102,908 | 9/1963 | Raynes | 260—707 |
| 3,277,167 | 10/1966 | Morita et al. | 260—707 |
| 3,325,549 | 6/1967 | Laine | 260—707 |
| 3,326,839 | 6/1967 | Barnes et al. | 260—45.9 |
| 3,364,262 | 1/1968 | Cyba | 260—45.9 |
| 3,448,588 | 6/1969 | Scoggin | 260—707 |

LEWIS GOTTS, Primary Examiner

J. R. BROWN, Assistant Examiner

U.S. Cl. X.R.

260—45.9 R, 619 R, 621 R, 707, 568